(12) United States Patent
Kulkarni et al.

(10) Patent No.: US 7,929,945 B2
(45) Date of Patent: Apr. 19, 2011

(54) MEASUREMENT DATA RECORD METHOD FOR DETECTING HYBRID MOBILE TUNE AWAY

(75) Inventors: Narayan A. Kulkarni, Wheaton, IL (US); Baoling S. Sheen, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/657,386

(22) Filed: Jan. 20, 2010

(65) Prior Publication Data

US 2010/0124169 A1 May 20, 2010

Related U.S. Application Data

(62) Division of application No. 11/418,614, filed on May 5, 2006, now abandoned.

(51) Int. Cl.
*H04M 11/00* (2006.01)

(52) U.S. Cl. .......................... 455/405; 370/331

(58) Field of Classification Search ............... 455/436
See application file for complete search history.

(56) References Cited

U.S. PATENT DOCUMENTS

| | | | |
|---|---|---|---|
| 2005/0070280 A1* | 3/2005 | Jung et al. | 455/434 |
| 2006/0004643 A1* | 1/2006 | Stadelmann et al. | 705/34 |

\* cited by examiner

*Primary Examiner* — Lester Kincaid
*Assistant Examiner* — Marcos Batista
(74) *Attorney, Agent, or Firm* — Carmen Patti Law Group, LLC

(57) ABSTRACT

An apparatus in one example has: a first communication network optimized for high-speed packet data services; a first database operatively coupled to the first communication network; a second communication network for providing both voice and slow data-rate data services; a second database operatively coupled to the second communication network; and an operations platform operatively coupled to the first and second databases. The first communication network optimized for high speed packet data will generate in the first database a record which will have at least: mobile ID type, mobile ID, connection ending time, cell, sector, carrier information; and last signal strength value. The second communication network providing both voice and low speed packet data will generate, in the second data base, a record that will have at least mobile ID type, call start time, call length, mobile ID (ESN/MEID), call type (data or voice), cell, sector, carrier information; and call disposition. The operations platform will link the records on the two databases based on mobile ID, call ending time, and the call start time. The linking of the two records with matching mobile ID and time stamps will give information about mobile tuneaway and the reason for the tune away.

9 Claims, 4 Drawing Sheets

MEASUREMENT DATA RECORD METHOD FOR DETECTING HYBRID MOBILE TUNE AWAY

CROSS REFERENCE TO RELATED APPLICATION

This application is a divisional application of U.S. Ser. No. 11/418,614, filed May 5, 2006 now abandoned, and assigned to the same assignee as the parent application.

TECHNICAL FIELD

The invention relates generally to telecommunication systems and, more specifically, to wireless networks containing IS-2000 (3G-1X) and IS-856 (HRPD) systems that support hybrid AT operation and provide a scheme for accurately evaluating the network performance.

BACKGROUND

As mobile communication systems become more prevalent, the demands for greater and more sophisticated service have grown. To meet the capacity needs of mobile communication systems, techniques of multiple access to a limited communication resource have been developed. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

Presently, there are many different types of communication networks offering services to users. Some types of communication networks are optimized for providing both voice and relatively slow data-rate data services to a user. Such communication networks include networks operating in accordance with Interim Standard (IS) 2000 (that is, IS-2000) or the Global System for Mobile (GSM) Communications standards, for example. On the other hand, other types of communication networks are optimized for providing efficient, relatively high-speed packet data services to the user. Such communication networks include high rate packet data (HRPD) networks operating in accordance with IS-856 communication standards, for example.

The user typically accesses voice and/or data services associated with the different types of communication networks using a mobile terminal, such as a wireless communication device, a cell phone, a personal data assistant, etc. However, conventional mobile terminals are typically capable of operating over only one type of communication network, such as with an IS-2000 network system, or alternatively, with an IS-856 network system. Therefore, such conventional mobile terminals do not individually provide optimized communication services to the user for both types of communication networks. As a result, the user may need to use multiple, different mobile terminals should the user wish to utilize the optimized services available on the different networks.

The access terminals complying with IS-878 are capable of communicating with both IS-2000 and IS-856 networks, but in separate transmission and receiving units. Such access terminals or mobile devices are known as hybrid devices and are increasingly deployed to provide voice and data services economically.

In prior art systems the 3G-1X and HRPD (high rate packet data) systems are overlay networks and operate independently. The hybrid mobile standards do not provide a mechanism for a mobile terminal to send a message to the HRPD regarding tune away. Thus, the HRPD is unaware of the tune away. Therefore, there is no provision to detect the mobile tune away in the overlay network configuration.

In overlay systems there is no known method for detecting mobile tune away, and as a result the HRPD may often treat the data call as a lost connection even though it was, in reality, a tune away. Hence, the HRPD dropped call rate may be reported higher than it what it really was.

Thus, there is a need in the art for an apparatus and method that provides wireless networks containing IS-2000 (3G-1X) and IS-856 (HRPD) systems that support the hybrid AT operation and provide a scheme for accurately evaluating the network performance.

SUMMARY

One embodiment of the present method and apparatus encompasses an apparatus. This embodiment may comprise: a first communication network optimized for high speed packet data services; a first database operatively coupled to the first communication network; a second communication network for providing both voice and slow data-rate data services; a second database operatively coupled to the second communication network; and an operations platform operatively coupled to the first and second databases.

Another embodiment of the present method and apparatus encompasses a method. This embodiment may comprise: collecting predetermined events associated with a call/connection of an AT (access terminal) in a measurement data record (MDR); storing the MDR in a network on a per call/connection basis; generating in a high rate packet data system a first MDR for a packet data call active in the HRPD system; tuning away, via an AT, from the HRPD system to a 3G-1X system; generating, in the 3G-1X system, a second MDR for the call in the 3G-1X system; and linking the first and second MDRs.

DESCRIPTION OF THE DRAWINGS

Features of exemplary implementations of the invention will become apparent from the description, the claims, and the accompanying drawings in which:

DETAILED DESCRIPTION

A hybrid access terminal is a mobile terminal capable of operating over different types of communication networks. Such a hybrid access terminal operates on both IS-2000 and IS-856 networks, and is capable of inter-system handoffs between these two types of networks. Such capabilities enable the hybrid access terminal to provide voice, data and short messaging services via IS-2000 networks, and also to provide high speed packet data service via IS-856 networks.

A measurement data record (MDR) may collect the key events associated with the call/connection and is stored in the system on a per call/connection bases. HRPD system may generate a MDR for the packet data call active in the HRPD system. When the AT tunes away to the 3G-1X system, the 3G-1X system may generate a MDR for the call in the 3G-1X system. The HRPD MDR may have the AT hardware Identification (ID) and time of tune away or mobile lost. The 3G-1X MDR will capture the AT hardware ID and time when the call was initiated in the 3G-1X system and the type of call.

By linking the two MDRs with the AT hardware ID and time of tune away, the AT tune away may be identified. The conditions during, or reason for tune away, may now be determined. This capability may be used to effectively tune the systems to optimize system performance and accurately measure performance of HRPD and 3G-1X systems.

Figure 1:
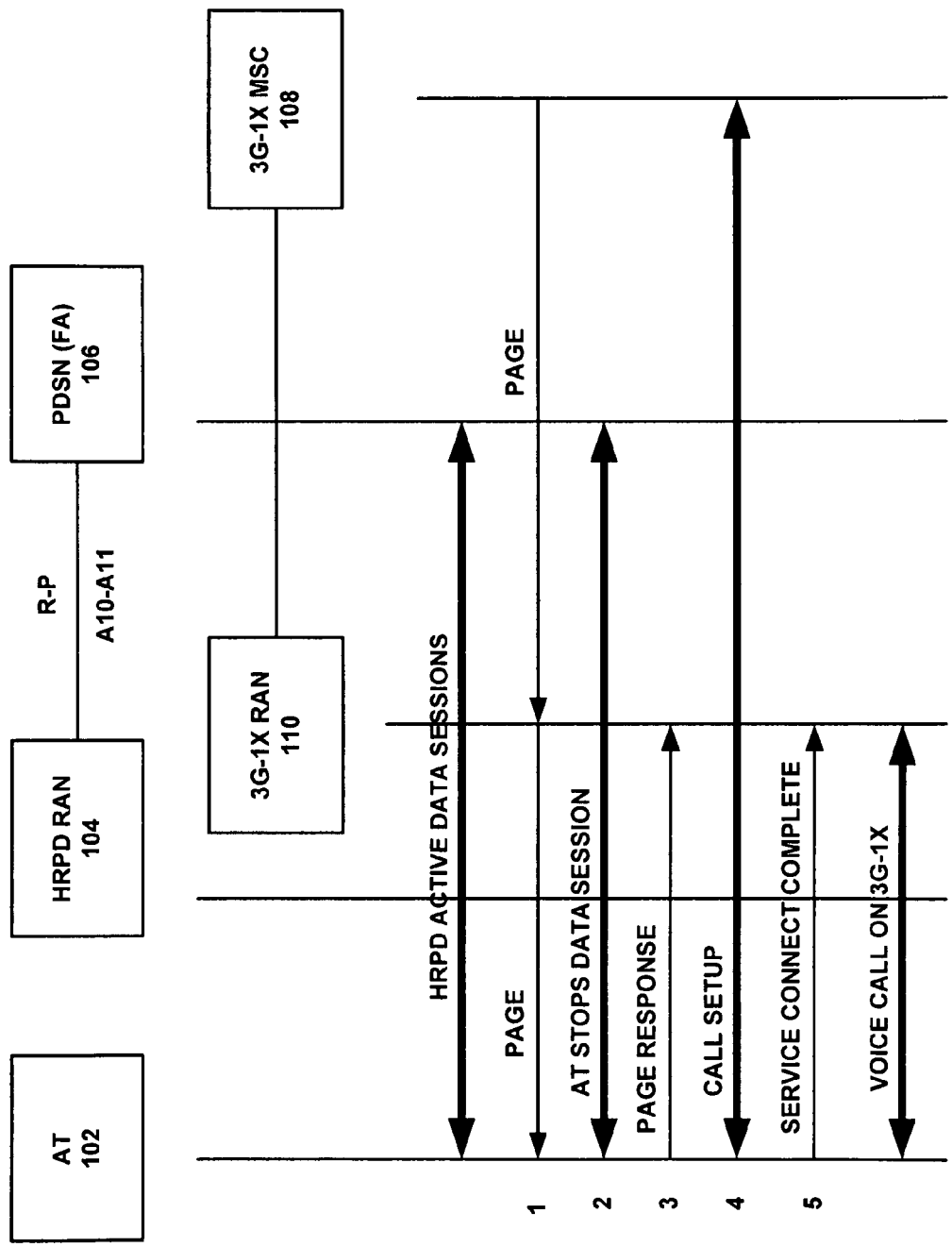
FIG. 1 depicts one embodiment of operation of an embodiment of the present method and apparatus.

FIG. 1 depicts one embodiment of operation of an embodiment of the present method and apparatus. In this embodiment a HRPD system may have a HRPD RAN 104 that is operatively coupled to a PDSN (FA) 106. Also, a 3G-1X system may have a 3G-1X RAN 110 operatively coupled to a 3G-1X MSC 108. The operation is as follows:

1. The 3G-1X RAN 110 sends a page for the AT 102.
2. The AT 102 detects the page, and stops transmitting/receiving on the HRPD system session.
3. The AT 102 sends a page response to the 3G-1X RAN 110.
4. A traffic channel in established in 3G-1X system (call setup).
5. A "service connect complete" message is sent to the 3G-1X RAN 110 in the 3G-1X system.

The voice call may now take place between the AT 102 and the 3G-1X system (110, and 108).

Figure 2:
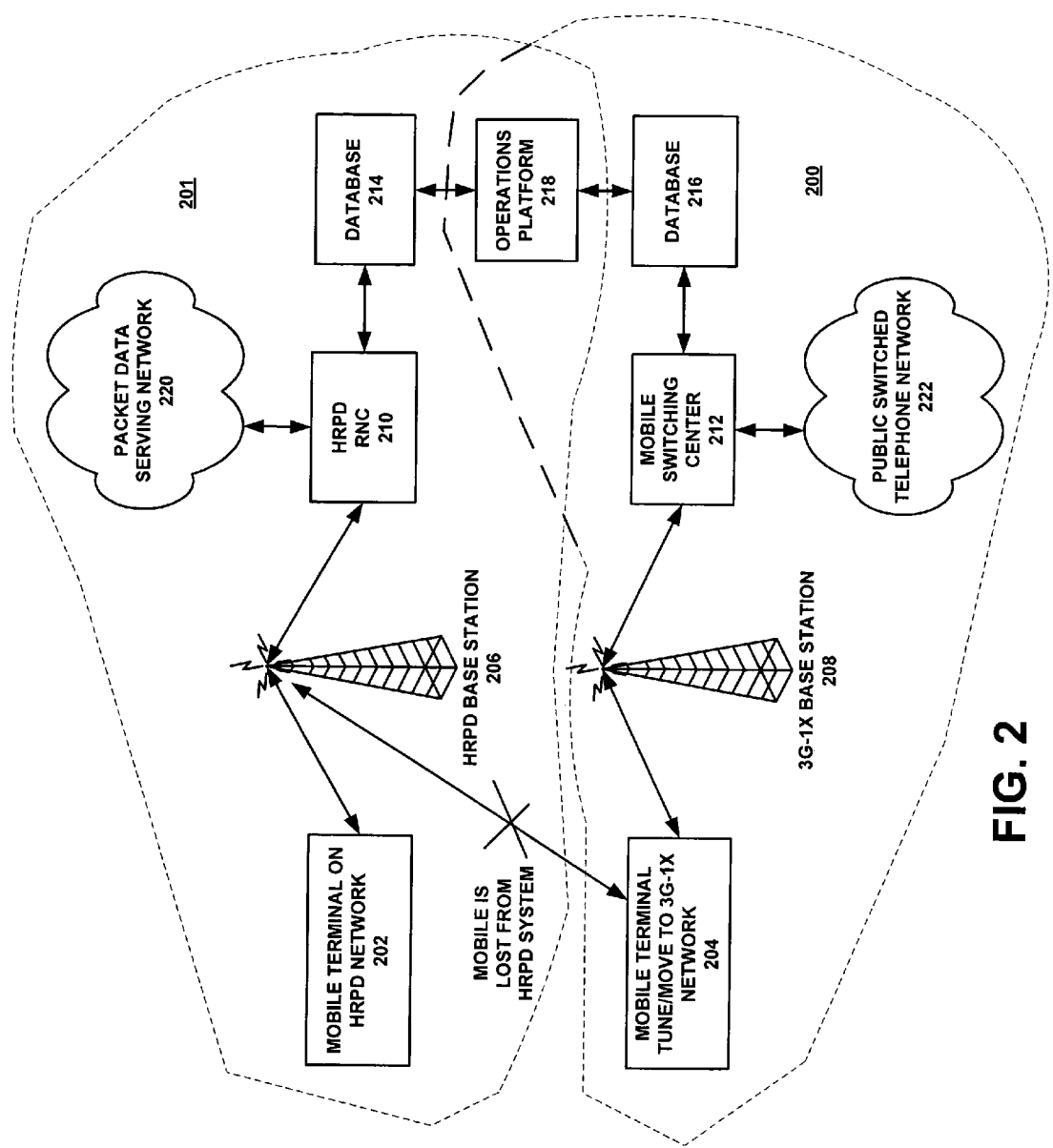
FIG. 2 is a representation of one embodiment in which wireless networks containing IS-2000 (3G-1X) and IS-856 (HRPD) systems support hybrid AT operation and provide a scheme for accurately evaluating the network performance.

FIG. 2 is a representation of one embodiment in which wireless networks containing IS-2000 (3G-1X) and IS-856 (HRPD) systems support hybrid AT operation and provide a scheme for accurately evaluating the network performance. In general a first communication network 201 which is optimized for high-speed packet data services, may be, for example, a high rate packet data (HRPD) network operating in accordance with IS-856 communication standards. The first communication network 201 may have a HRPD RNC (radio network controller) 210 that is operatively coupled to a base station 206. The base station 206 may be in wireless communication with a mobile terminal 202. A first database 214 may be operatively coupled to the first communication network 201. An MDR may be stored in the first database. The HRPD RNC 210 may also be operatively coupled to a packet data serving network 220.

A second communication network 200 provides both voice and slow data-rate data services and may be, for example, an IS-2000 network. The second communication network 200 may have a mobile switching center 212 that is operatively coupled to a base station 208. The base station 208 may be in wireless communication with a mobile terminal 204. A second database 216 may be operatively coupled to the second communication network 200. An MDR may be stored in the second database. The mobile switching center 212 may also be operatively coupled to a public switched telephone network 222.

An operations platform 218 may be operatively coupled to the first and second databases 214, 216. The operations platform links the MDRs in the first and second databases 212, 210.

In this scenario an AT (such as mobile terminal 204) tunes away from a HRPD active data connection to a 3G-1X system to receive an incoming voice call. While in the active data session in the HRPD system, the AT listens to 3G-1X page messages on predetermined slots on control channels. The AT receives a page from the 3G-1X system. The AT then stops transmitting/receiving data to/from the HRPD system after it receives the page message. At this time the connection to the HRPD system is terminated and the HRPD generates a MDR for this connection. The time is stamped when the AT terminated the call (the AT does not communicate or send any message to the HRPD about the tune away). The HRPD system interprets that the mobile terminal has lost if it does not get a response to the heart beats within the predetermined time and releases all resources allocated to the connection. The fields in the HRPD MDR record for linking the HRPD and 3G-1X MDR may be: mobile ID type; mobile ID (ESN/MEID); connection request time; connection established time; connection ending time; cell, sector and carrier information; and mobile's last signal strength value.

The AT then responds to the 3G-1X voice page message to initiate voice call setup.

The 3G-1X and AT go through several call processing steps to set up the traffic channel and other resources to process the call.

Call setup is complete when the AT responds to the 3G-1X system with a "service connect complete" message. When the call is terminated, the 3G-1X system generates an MDR for the call completed in the 3G-1X system. The fields in the 3G-1X MDR record for linking HRPD and 3G-1X MDR may be: mobileID type; call start time; call length; mobile ID (ESN/MEID); call type (data or voice); cell, sector and carrier information; and call disposition.

The mobile tune away is confirmed by the operations platform 218 by looking at the HRPD MDR and the 3G-1X MDR if the mobile IDs match in the two records and also the call ending time in the HRPD MDR should match with the call start time in the 3G-1X MDR.

FIG. 2 depicts one embodiment of the operation of the FIG. 1 embodiment.

Figure 3:
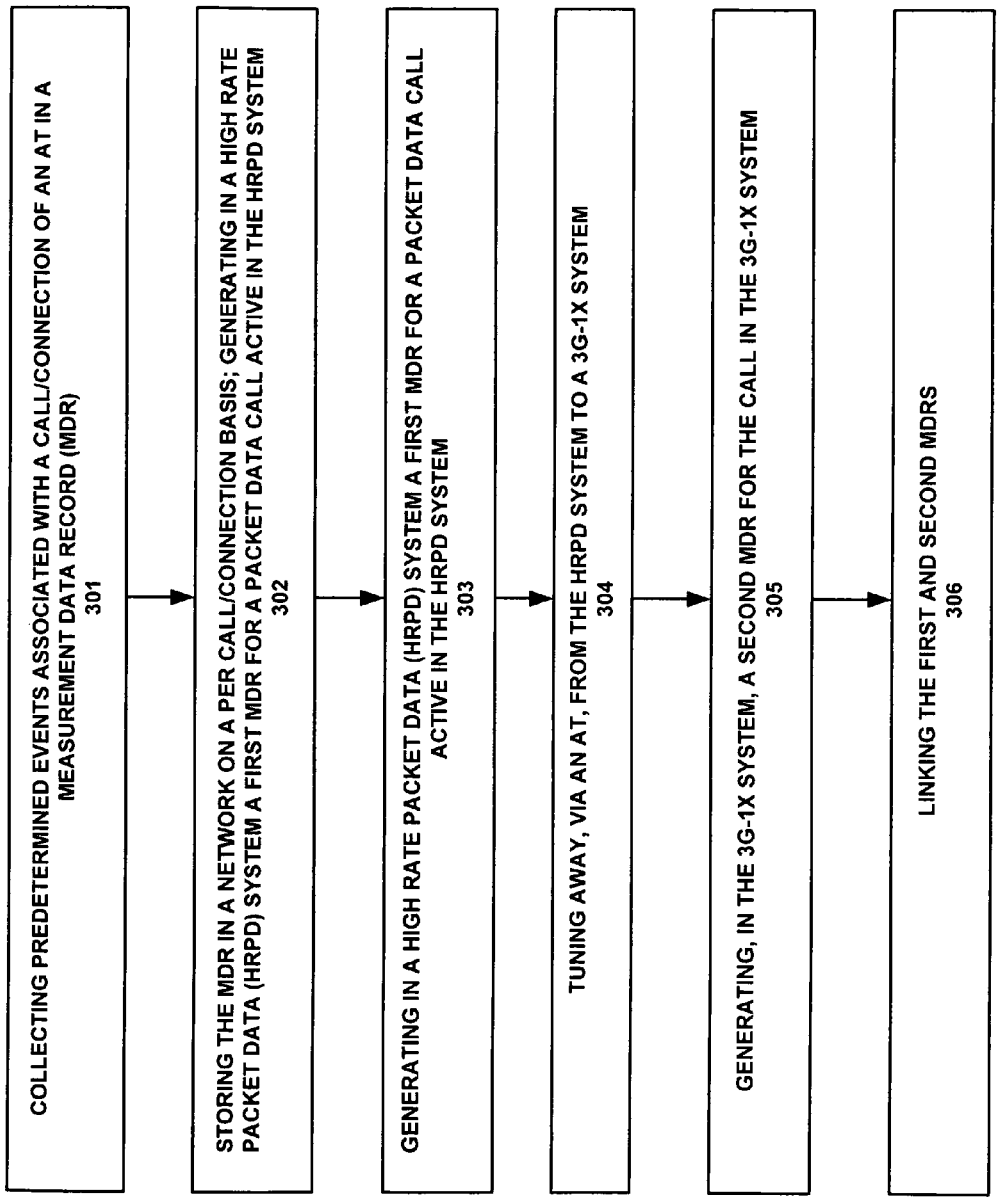
FIG. 3 is a flow diagram of an embodiment according to the present method.

FIG. 3 is a flow diagram of one embodiment according to the present method. This embodiment may have the steps of: collecting predetermined events associated with a call/connection of an AT in a measurement data record (MDR) (301); storing the MDR in a network on a per call/connection basis (302); generating in a high rate packet data (HRPD) system a first MDR for a packet data call active in the HRPD system (303); tuning away, via an AT, from the HRPD system to a 3G-1X system (304); generating, in the 3G-1X system, a second MDR for the call in the 3G-1X system (305); and linking the first and second MDRs (306).

Figure 4:
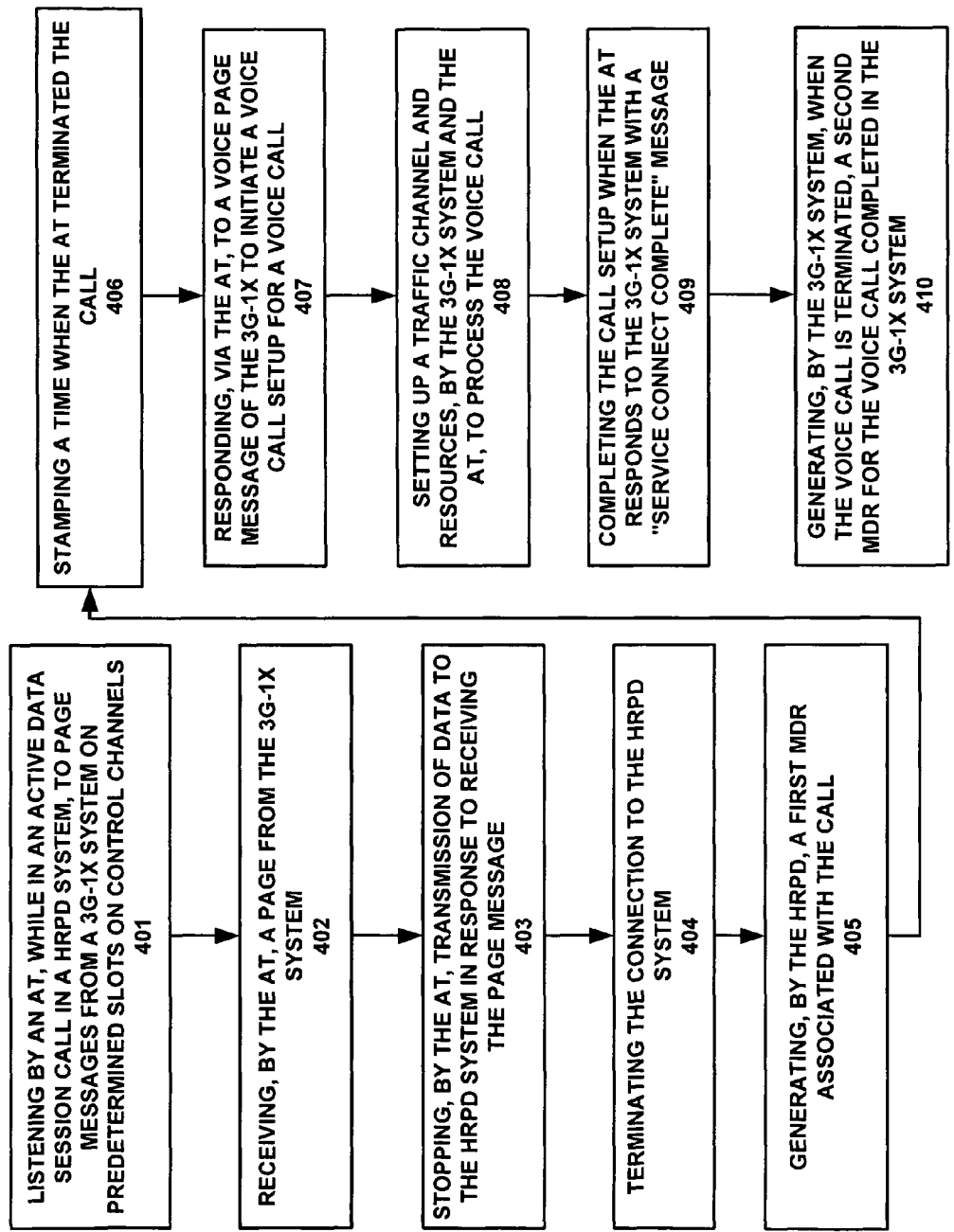
FIG. 4 depicts another embodiment of the present method.

FIG. 4 depicts another embodiment of the present method. This embodiment may have the steps of: listening by an AT, while in an active data session call in a HRPD system, to page messages from a 3G-1X system on predetermined slots on control channels (401); receiving, by the AT, a page from the 3G-1X system (402); stopping, by the AT, transmission of data to the HRPD system in response to receiving the page message (403); terminating the connection to the HRPD system (404); generating, by the HRPD, a first MDR associated with the call (405); stamping a time when the AT terminated the call (406); responding, via the AT, to a voice page message of the 3G-1X to initiate a voice call setup for a voice call (407); setting up a traffic channel and resources, by the 3G-1X system and the AT, to process the voice call (408); completing the call setup when the AT responds to the 3G-1X system with a "service connect complete" message (409); and generating, by the 3G-1X system, when the voice call is terminated, a second MDR for the voice call completed in the 3G-1X system (410).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising:
    collecting predetermined events associated with a call/connection for an access terminal (AT) in a measurement data record (MDR);
    generating a first MDR for a packet data call active in a high rate packet data (HRPD) system;
    storing the first MDR in a first database in the HRPD system;
    tuning away from the HRPD system to a 3G-1X system;
    generating a second MDR for the call in the 3G-1X system;
    storing the second MDR in a second database in the 3G-1X system;
    linking the first and second MDRs, the access terminal having a hardware ID, the first and second MDRs being linked with an access terminal hardware ID of the access terminal and a time of tune away of the access terminal; and
    confirming the tune away of the access terminal if access terminal hardware IDs match in the first and second MDRs and if a call ending time associated with the access terminal in the first MDR matches a call start time with the access terminal in the second MDR.

2. The method according to claim 1, wherein the linking of the first and second MDRs is associated with a hardware identification of an associated AT and a time of tune away.

3. The method according to claim 1, wherein the method further comprises identifying an associated AT by the linking of the first and second MDRs associated with an AT hardware ID and time of tune away.

4. The method according to claim 3, wherein the linking of the first and second MDRs is associated with a hardware identification of an associated AT and a time of tune away, and wherein the method further comprises determining at least one of conditions during tune away and reasons for tune away.

5. The method according to claim 4, wherein the method further comprises tuning the systems to optimize system performance and accurate measurement of performance of the HRPD and 3G-1X systems.

6. An apparatus, comprising:
    a first MDR for a packet data call active in a high rate packet data (HRPD) system;
    a second MDR for the call in a 3G-1X system, the second MDR being a result of a tuning away-from the HRPD system to the 30-1X system; and
    an operations platform configured for linking the first and second MDRs, the two MDRs being linked by hardware ID and a time of tune away;
    wherein the tune away is confirmed by the operations platform if hardware IDs match in the first and second MDRs and if a call ending time in the first MDR matches a call start time in the second MDR.

7. The apparatus according to claim 6, wherein the first MDR for the HRPD system has a hardware identification of an associated AT and a time of tune away by the AT.

8. The apparatus according to claim 6, wherein the second MDR for the 3G-1X system has a hardware identification of an associated AT and a time when the call was initiated in the 30-1X system and a type of the call.

9. The apparatus according to claim 6, wherein the linking of the first and second MDRs is associated with a hardware identification of an associated AT and a time of tune away.

\* \* \* \* \*